(12) United States Patent
Wobben

(10) Patent No.: US 8,500,402 B2
(45) Date of Patent: Aug. 6, 2013

(54) ROTOR BLADE FOR A WIND POWER STATION

(76) Inventor: Aloys Wobben, Aurich (DE)

( * ) Notice: Subject to any disclaimer, the term of this patent is extended or adjusted under 35 U.S.C. 154(b) by 1147 days.

(21) Appl. No.: 11/721,653

(22) PCT Filed: Dec. 13, 2005

(86) PCT No.: PCT/EP2005/056726
§ 371 (c)(1),
(2), (4) Date: Jul. 14, 2009

(87) PCT Pub. No.: WO2006/063990
PCT Pub. Date: Jun. 22, 2006

(65) Prior Publication Data
US 2009/0304505 A1  Dec. 10, 2009

(30) Foreign Application Priority Data

Dec. 14, 2004  (DE) .......................... 10 2004 060 449
Apr. 15, 2005  (DE) .......................... 10 2005 017 716

(51) Int. Cl.
*F01D 25/02* (2006.01)
*F03D 11/00* (2006.01)

(52) U.S. Cl.
USPC ............................................ 416/61; 415/118

(58) Field of Classification Search
USPC ................. 290/44, 45; 415/118; 416/61, 60
See application file for complete search history.

(56) References Cited

U.S. PATENT DOCUMENTS

| | | | | |
|---|---|---|---|---|
| 5,596,320 A | * | 1/1997 | Barnes | 340/962 |
| 5,874,672 A | * | 2/1999 | Gerardi et al. | 73/170.26 |
| 6,425,286 B1 | * | 7/2002 | Anderson et al. | 73/170.26 |
| 6,430,996 B1 | * | 8/2002 | Anderson et al. | 73/170.26 |
| 6,612,810 B1 | * | 9/2003 | Olsen et al. | 416/95 |
| 6,940,186 B2 | * | 9/2005 | Weitkamp | 290/44 |
| 7,086,834 B2 | * | 8/2006 | LeMieux | 416/1 |

FOREIGN PATENT DOCUMENTS

| | | |
|---|---|---|
| DE | 19927015 | 12/2000 |
| DE | 20021970 U1 | 4/2001 |
| DE | 20206704 U1 | 8/2002 |
| DE | 10160522 A1 | 6/2003 |
| DE | 10315676 A1 | 11/2004 |
| WO | 02053910 A1 | 7/2002 |

* cited by examiner

*Primary Examiner* — Nathaniel Wiehe
*Assistant Examiner* — Woody A Lee, Jr.
(74) *Attorney, Agent, or Firm* — Seed IP Law Group PLLC

(57) ABSTRACT

Described is a rotor blade for a wind power installation having a rotor blade leading edge. A deposit sensor device is arranged in the region of the rotor blade leading edge. That deposit sensor device has a transmitter for the wireless transmission of signals by way of a transmission link and a receiver for receiving the signals wirelessly transmitted by way of the transmission link. Deposits on the surface can be detected in the region of the transmission link on the basis of the signals transmitted by way of the transmission link.

14 Claims, 4 Drawing Sheets

ROTOR BLADE FOR A WIND POWER STATION

BACKGROUND

1. Technical Field

The present invention concerns a rotor blade for a wind power installation as well as a wind power installation having a corresponding rotor blade.

2. Description of the Related Art

In relation to wind power installations it is desirable in particular in the cold time of the year to detect icing on the rotor blades in order to implement suitable de-icing measures. Icing of the rotor blades is not wanted as the icing causes an increase in the weight of the rotor blades. In addition lumps of ice which come away from the rotor blade during operation of a wind power installation can become dangerous projectiles and can cause injury to persons or damage to property. Furthermore lumps of ice which come away from the rotor blade can result in unbalance of the rotor blades, which ultimately can have the result that the installation has to be shut down. However it is undesirable for economic reasons to shut down the installation.

In order to prevent that many wind power installations have a heating arrangement for the rotor blades in order to prevent the first beginnings of icing. Furthermore the wind power installations can also be shut down in the event of incipient ice formation. In that case however it is necessary to reliably detect incipient ice formation.

With known sensor systems for detecting the first beginnings of icing on a rotor blade of a wind power installation the corresponding sensors are installed on the pod of the installation. That means however that it is not possible to achieve direct comparability of the flow and icing conditions as different flow conditions prevail at the rotor blade.

DE 202 06 704 discloses an ice sensor for a wind power installation. The ice sensor is disposed in the proximity of the rotor blade tips. The data ascertained are processed having regard to the basic meteorological conditions in order to be able to undertake suitable measures.

As state of the art attention is also directed generally at this juncture to the following publications: DE 199 27 015 A1, DE 103 15 676 A1, DE 101 60 522 A1 and DE 200 21 970 U1.

BRIEF SUMMARY

Therefore the object of the present invention is to provide a rotor blade for a wind power installation, which can distinguish between deposits such as dirt and incipient ice formation.

That object is attained by a rotor blade as set forth in claim 1 and by a wind power installation as set forth in claim 11.

Thus there is provided a rotor blade for a wind power installation having a rotor blade nose, also known as a leading edge. A deposit sensor device is disposed in the region of the rotor blade leading edge. That deposit sensor device has a transmitter for the wireless transmission of signals by way of a transmission link and a receiver for receiving the signals wirelessly transmitted by way of the transmission link. On the basis of the signals communicated by way of the transmission link it is possible to detect deposits on the surface in the region of the transmission link.

Accordingly there is provided a rotor blade having a deposit sensor device which is capable of quickly and reliably detecting deposits on the surface of the rotor blade.

In accordance with an aspect of the present invention the rotor blade or the wind power installation has a comparison device which serves to compare the signals transmitted by the transmitter and received by the receiver in order to establish changes. By virtue of establishing the changes in the transmitted signals it is possible to directly establish the extent to which the transmission behavior of the transmission link changes so that deposits can be detected directly.

In accordance with a further aspect of the present invention the comparison device has a storage device for storing the detected changes in respect of the received signals so that a data bank is set up. Conclusions regarding the frequency and the conditions when deposits occur can be ascertained on the basis of the data bank.

In accordance with a preferred aspect of the present invention the deposit sensor device represents an optical sensor device. Detection of deposits is thus effected based on optical signals so that there is no interaction with the electronic and electrical components of the wind power installation.

In accordance with a further aspect of the present invention the transmitter has a coupling-out lens and the receiver has a coupling-in lens. The effectiveness in terms of the transmission of the optical signals can be improved in that way.

In accordance with a further preferred aspect of the present invention both the transmitter and also the receiver are respectively connected to the comparison device by way of optical waveguides. In that fashion it is possible to avoid electric lines in the rotor blade in order further to improve protection from lightning.

BRIEF DESCRIPTION OF THE SEVERAL VIEWS OF THE DRAWINGS

The invention and embodiments by way of example thereof are described in greater detail hereinafter with reference to the drawings in which.

DETAILED DESCRIPTION

Figure 1:
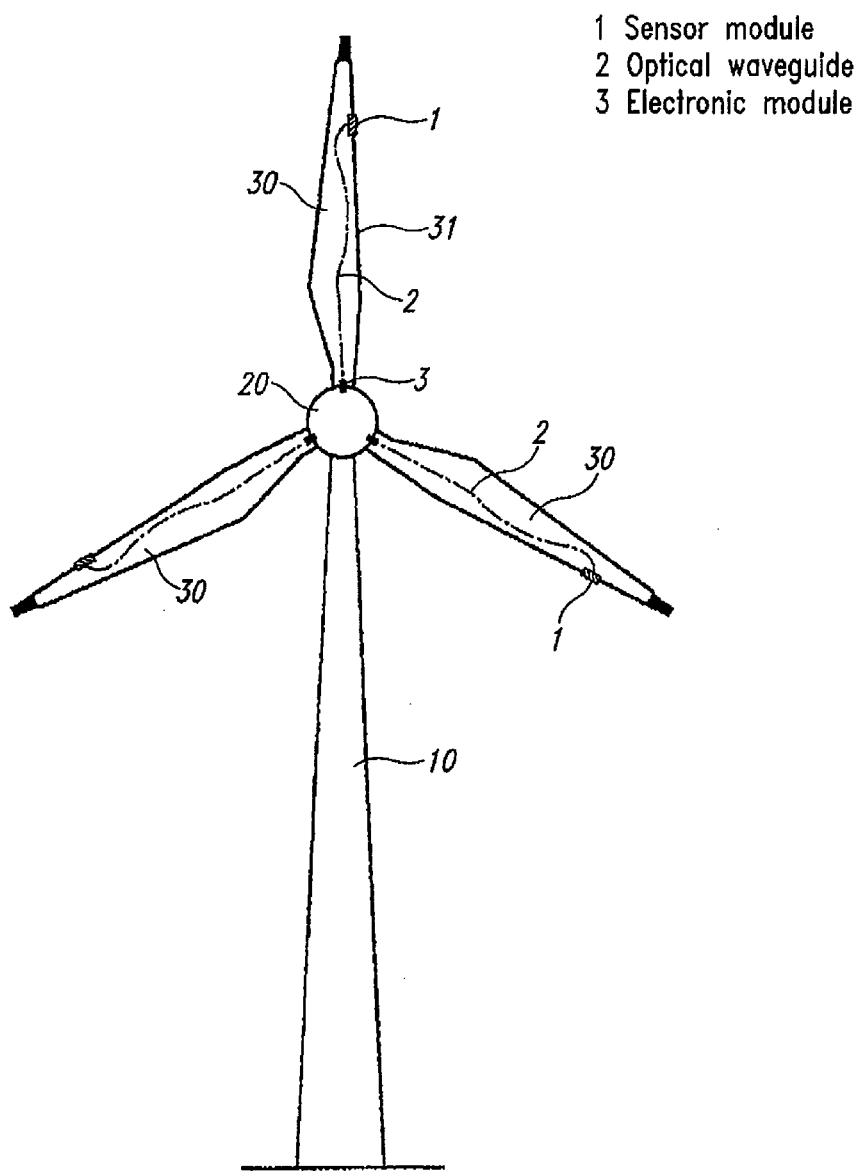
FIG. 1 shows a front view of a wind power installation in accordance with the first embodiment.

FIG. 1 shows a front view of a wind power installation in accordance with a first embodiment. In this arrangement the wind power installation has a pylon 10, a pod 20 and three rotor blades 30. A deposit sensor 1 is arranged at each of the rotor blades. Preferably the deposit sensor 1 is arranged at the rotor blade leading edge. The deposit sensors 1 are each connected to a comparison device 3 by way of optical waveguides 2.

Figure 2:
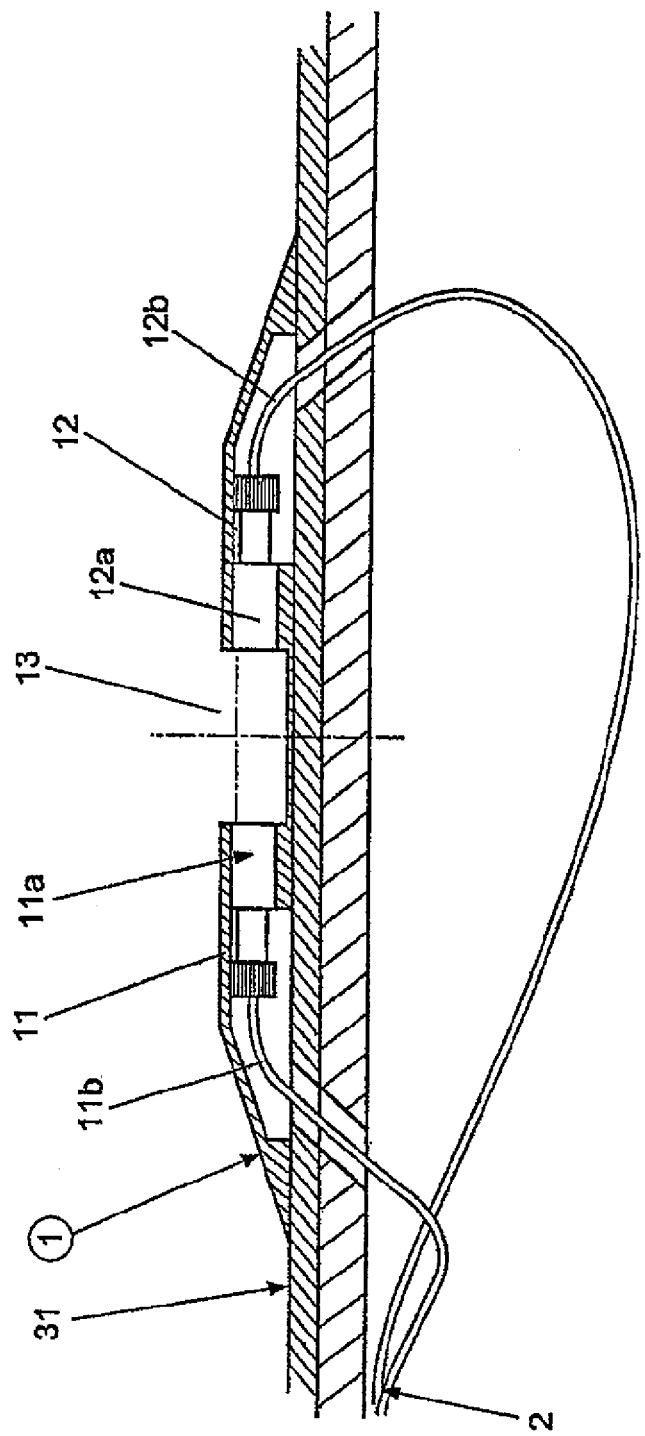
FIG. 2 shows a sectional view of a portion of a rotor blade of the wind power installation of FIG. 1.

FIG. 2 shows a sectional view of a portion of a rotor blade 30 of the wind power installation of FIG. 1. In particular the portion of the rotor blade in the region of the deposit sensor 1 is illustrated here. The deposit sensor is mounted in the region of the rotor blade leading edge 31 of the rotor blade 30. The deposit sensor 1 substantially comprises an optical transmitter 11 and an optical receiver 12. The optical transmitter 11 is provided with a coupling-out lens 11a and the optical receiver 12 is provided with a coupling-in lens 12a. The optical transmitter 11 and the optical receiver 12 are each connected to the comparison device 3 by way of optical waveguides 11b, 12b, 2. An optical transmission link 13 is provided between the coupling-out lens 11a and the coupling-in lens 12a. That optical transmission link extends substantially parallel to the surface of the rotor blade leading edge 31.

Thus the deposit sensor 1 is mounted directly to the rotor blade of the wind power installation so that the corresponding deposits such as for example soiling with dirt and icing can be ascertained directly on the rotor blade. Preferably the deposit sensors are arranged in the outer third of the rotor blade (see FIG. 1) as here there is a higher level of certainty in terms of recognizing deposits such as for example dirt soiling and icing. In addition thereto it is possible to arrange further deposit sensors 1 at other locations on the rotor blade so that it is possible to obtain a system with multiple redundancy.

As electric lines in a rotor blade of a wind power installation are not desirable in terms of protection from lightning, the sensor system according to the invention is divided substantially into two parts, namely the actual sensor and the evaluation unit. Preferably in that case the comparison unit is arranged in the blade root of the rotor blade or at a rotating part of the machine housing. The optical sensor and receiver in contrast are arranged on the rotor blade itself. Transmission of the light signal from the comparison device to the optical receiver is preferably effected by way of optical waveguides so that it is possible to avoid further electric lines in the rotor blade. As an alternative thereto the comparison device can also be arranged directly in or at the deposit sensor 1 if suitable protection from lightning is provided.

Preferably the connections between the optical transmitter 11 and the optical receiver 12 and the respective optical waveguides 11b, 12b, 2 are ensured by means of plug contacts or by means of a screw arrangement. Accordingly the deposit sensor 1 can be replaced in a simple fashion without the entire rotor blade having to be replaced in that case.

As shown in FIG. 2 the deposit sensor 1 preferably has a coupling-out lens 11a and a coupling-in lens 12a in order to permit a low level of attenuation of the light beam between the optical transmitter 11 and the optical receiver 12. As soon as deposits occur in the optical transmission link 13, the transmission characteristics of that transmission link 13 are altered, and that can be detected by the comparison device 3.

Figure 3:
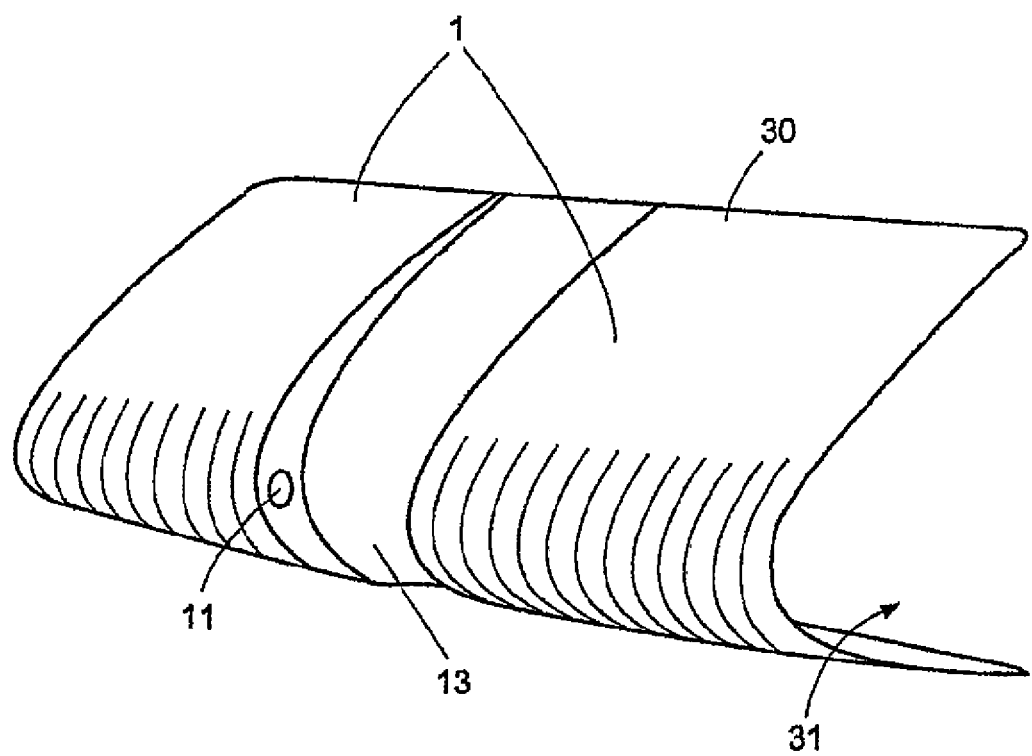
FIG. 3 shows a plan view of a portion of a rotor blade of the wind power installation of FIG. 1.

FIG. 3 shows a plan view of a portion of the rotor blade of FIG. 1 in the region of the deposit sensor 1. In this case the deposit sensor 1 is fixedly connected to the rotor blade leading edge 31 of the rotor blade 30. That can be effected by screw means or adhesive. In this case the optical transmission link 13 is oriented substantially parallel to the rotor blade leading edge in the longitudinal direction of the rotor blade. Preferably the position of the optical sensor 11 and of the optical receiver 12 should be arranged in the region of the profile stagnation point as that represents the most probable location for the beginnings of a deposit. The external configuration of the deposit sensor 1, which is shown in FIG. 3, ensures a low-loss flow around the deposit sensor 1. In addition, in the region of the air gap, that is to say the optical transmission link 13, by virtue of the channeling effect on the flow around the rotor blade leading edge, the illustrated configuration of the deposit sensor 1 serves to prevent dirt soiling at the optical transmitter and receiver. By virtue of the particular configuration of the deposit sensor the directional vectors of the flow are never directed directly in the direction of the optical transmitter 11 and the optical receiver 12 or the entry or exit locations thereof.

Rather, the directional vectors of the flow are arranged substantially perpendicularly thereto. The recessing of the deposit sensor 1 in the leading edge contour, which occurs due to the optical transmission link 13, should preferably be sufficiently wide to not noticeably alter the formation mechanisms involved in the formation for example of ice and sufficiently narrow to ensure minimum attenuation or influencing of the light beam in the optical transmission link 13 due to dirt soiling or deformation of the blade.

In order to reduce the influence of the incident sunlight on the optical receiver 12 the light beam transmitted by way of the transmission link 13 is preferably pulsed. With a suitable arrangement, it is possible to implement raster-controlled ice thickness measurement by means of further miniaturization of the deposit sensor 1.

Figure 4:
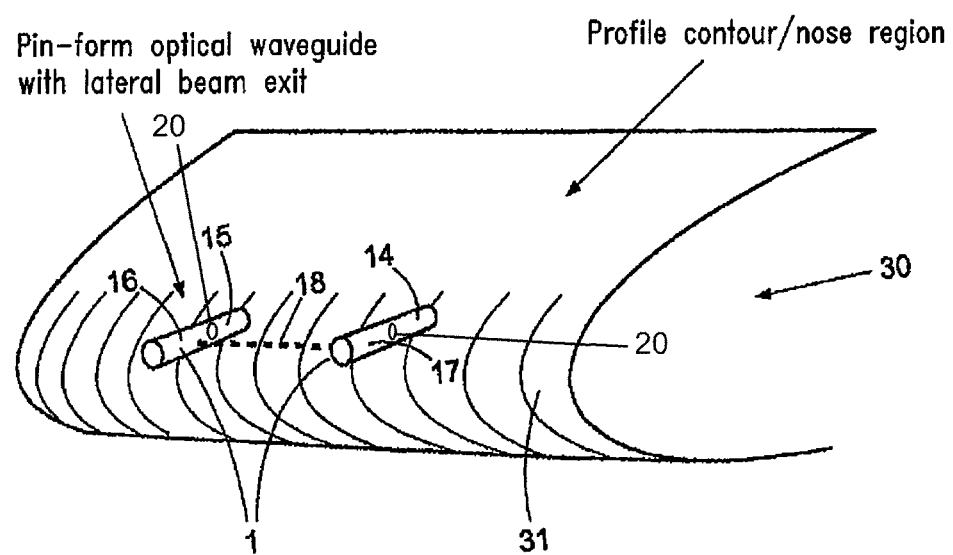
FIG. 4 shows a plan view of a portion of a rotor blade of a wind power installation in accordance with a second embodiment.

FIG. 4 shows a plan view of a portion of a rotor blade leading edge of a rotor blade for a wind power installation in accordance with a second embodiment. In this case the deposit sensor 1 in accordance with the second embodiment is based on the same operating principle as the deposit sensor 1 in accordance with the first embodiment, that is to say there are provided an optical transmitter 16, an optical receiver 17 as well as an optical transmission link 18 between the transmitter 16 and the receiver 17. While in the first embodiment the deposit sensor is substantially matched to the contour of the rotor blade leading edge, the deposit sensor in the second embodiment is implemented by needle-form or pin-form optical waveguides which issue from the profile leading edge or the rotor blade leading edge.

In the second embodiment the deposit sensor 1 is embodied by two pin-form optical waveguides 14, 15 which protrude out of the surface of the rotor blade and which have a lateral beam exit. A mirror, lens or prism 20 in the waveguides 14 and 15 permit a structure wherein optical waveguides can be passed in the interior of the rotor blade to the underside of the optical waveguides 14, 15. The light beam is thus deflected through 90° by the mirror, lens or the prism 20 respectively so that the light beam can extend substantially parallel to the surface of the rotor blade over the optical transmission link 18 from the optical transmitter 16 to the optical receiver 17. The optical receiver 17 also has a mirror, lens or a prism 20 in order to deflect the light beam through 90° and to couple it into the returning optical waveguide.

In substance the structure in principle of the deposit sensor 1 of the second embodiment corresponds to that of the first embodiment. In the second embodiment however the structure is of a substantially simpler configuration. Furthermore, a modification to the rotor blade at its leading edge contour is only necessary to a very slight extent. Preferably the optical transmitter 16 and the optical receiver 17 are designed so that they can be screwed to or plugged into the corresponding lenses for 90° deflection so that they can be readily replaced if required.

Preferably the optical transmitter 16 and the optical receiver 17 are not arranged precisely at the foremost point of the rotor blade leading edge but in slightly displaced relationship therewith. In other words: the deposit sensor 1 is not arranged in the foremost region of the blade leading edge, that is to say the leading edge line. The deposit sensor 1 can thus be arranged in the region of the blade leading edge.

Preferably the deposit sensor in accordance with the first or the second embodiment should be arranged in the region of the rotor blade leading edge, in the region of the stagnation point. In that respect the stagnation point represents the point at which the airflow impinges on the blade and is then divided into a first flow along the suction side and a second flow along the pressure side. In the region of that stagnation point incipient ice formation will begin and will then build up further in accordance with a random pattern. It is not possible to make a precise prediction about the position of the stagnation point as that is also dependent on the angle of incidence of the rotor blade.

The height of the optical transmitter 16 and the optical receiver 17 or the lenses thereof can be adapted to be adjustable over the surface of the rotor blade. That can be achieved by the optical transmitter 16 and the optical receiver 17 protruding to a greater or lesser distance out of the rotor blade surface. The spacing between the optical transmitter 16 and the optical receiver 17 can be between 10 and 100 mm, preferably 20 and 50 mm. The spacing between the light beam between the optical transmitter 16 and the optical receiver 17 and the rotor blade surface (that is to say the spacing of the light beam from the rotor blade surface) is between 2 and 10 mm and preferably between 5 and 6 mm. The spacing between the surface of the rotor blade and the light beam between the optical transmitter and the optical receiver determines the thickness of ice which can be detected. In that respect an ice thickness below 2 mm can remain disregarded while a thicker layer of ice than preferably 5-6 mm can lead to considerable problems.

In order to permit simplified replacement of the lens, it is possible to provide in the rotor blade socket sleeves into which a lens, that is to say an optical transmitter or an optical receiver, can be fitted. Preferably a positively locking connection such as for example a bayonet connection is provided between the sleeve and the optical transmitters and optical receivers. Alternatively or in addition thereto the sleeves and the optical transmitter and the optical receiver can be screwed together. That is advantageous in particular to the effect that the optical receivers and optical transmitters are more stably protected against incipient icing and are not torn out of the blade during an ice removal operation and fall down with the ice.

In accordance with a further embodiment based on the first or the second embodiment the comparison device 3 can have a storage device in which characteristic deposits are stored so that in operation they can be compared to the values which are actually detected. Accordingly it is possible for example to distinguish whether the deposits only involve soiling due to bird droppings or dust or whether the situation involves incipient ice formation. In addition thereto the comparison device 3 can process further data from the environment of the wind power installation. Those data can represent for example temperature data so that for example the deposit sensor 1 can be switched off as from a temperature of 3° C. as ice formation is not to be expected as from such temperatures.

In addition the comparison device can have a data bank storage device in which the detected changes can be stored and possibly evaluated in order for example to be able to establish an icing pattern in order possibly to permit suitable early recognition.

The comparison device can also be arranged outside the rotor blade, for example in the region of the hub, which has the advantage that electric lines do not have to be laid in the rotor blade. In such a case the rotor blade, in the transitional region to the hub, has one or more suitable connections or couplings in order to couple the deposit sensor to the comparison device. In that way it can be provided that only optical waveguides have to be laid in the rotor blade, which is found to be advantageous in particular in regard to protection from lightning.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade for a wind power installation comprising:
a leading edge of the rotor blade;
a deposit sensor device arranged in a region of the leading edge of the rotor blade, the deposit sensor device having a transmitter configured to wirelessly transmit signals by way of a transmission link and a receiver configured to receive the signals wirelessly transmitted by way of the transmission link, the transmitter and the receiver being separated from one another and each protruding in pin form out of a surface of the rotor blade;
wherein deposits located on the surface of the rotor blade and in the transmission link are detected by way of the signals transmitted through the transmission link; and
wherein the transmission link is located between the transmitter and the receiver and extends substantially parallel to the leading edge of the rotor blade.

2. The rotor blade of claim 1, comprising:
a comparison device configured to compare the signals transmitted by the transmitter and received by the receiver in order to detect changes in the received signals.

3. The rotor blade of claim 2, comprising:
a connection for coupling an external comparison device to the deposit sensor device, wherein the signals transmitted by the transmitter and received by the receiver are compared in the comparison device in order to detect changes in the received signals.

4. The rotor blade of claim 1 wherein the deposit sensor device is adapted for continuously detecting deposits or for detecting deposits at predetermined time intervals.

5. The rotor blade of claim 2 wherein the comparison device has a storage device for storing the detected changes in order to produce a data bank.

6. The rotor blade of claim 1 wherein the deposit sensor device represents an optical sensor device.

7. The rotor blade of claim 6 wherein the transmitter has a coupling-out lens and the receiver has a coupling-in lens.

8. The rotor blade of claim 2 wherein the transmitter and the receiver are each connected to the comparison device by way of optical waveguides.

9. The rotor blade of claim 1 wherein a transition in each case between the transmitter and the surface of the rotor blade and between the receiver and the surface of the rotor blade is of a sharp-edged configuration.

10. A wind power installation comprising at least one rotor blade as set forth in claim 1.

11. A rotor blade for a wind power installation comprising:
a leading edge having an outside surface;
a wireless signal transmitter protruding in pin form from the outside surface of the leading edge and configured to transmit a signal parallel to the leading edge of the rotor blade;
a wireless signal receiver that is spaced apart from the wireless signal transmitter and protruding in pin form from the outside surface of the leading edge and configured to receive the signal which has been transmitted parallel to the leading edge of the rotor blade;

a gap positioned over the outside surface of the rotor blade between the transmitter and the receiver; and a comparison device coupled to the receiver and the transmitter.

12. The rotor blade of claim 11 wherein the transmitter and the receiver each comprise an optical waveguide protruding from a surface of the leading edge.

13. The rotor blade of claim 12 wherein a mirror, lens or prism is configured to deflect the signal between the transmitter and the receiver.

14. The rotor blade of claim 11 comprising an optical waveguide coupled between the receiver and the comparison device.

* * * * *